United States Patent
Kuntke et al.

(10) Patent No.: US 9,725,812 B2
(45) Date of Patent: Aug. 8, 2017

(54) METHOD FOR NITROGEN RECOVERY FROM AN AMMONIUM COMPRISING FLUID AND BIO-ELECTROCHEMICAL SYSTEM

(71) Applicant: Magneto special anodes B.V., Schiedam (NL)

(72) Inventors: Philipp Kuntke, Leeuwarden (NL); Tomas Hubertus Sleutels, Leeuwarden (NL); Hubertus Victor Hamelers, Leeuwarden (NL); Machiel Saakes, Leeuwarden (NL); Cees Jan Buisman, Leeuwarden (NL)

(73) Assignee: W&F TECHNOLOGIES B.V., Zevenbergen (NL)

( * ) Notice: Subject to any disclaimer, the term of this patent is extended or adjusted under 35 U.S.C. 154(b) by 519 days.

(21) Appl. No.: 14/371,226

(22) PCT Filed: Jan. 10, 2013

(86) PCT No.: PCT/NL2013/050012
§ 371 (c)(1),
(2) Date: Jul. 9, 2014

(87) PCT Pub. No.: WO2013/105854
PCT Pub. Date: Jul. 18, 2013

(65) Prior Publication Data
US 2015/0017089 A1 Jan. 15, 2015

(30) Foreign Application Priority Data

Jan. 10, 2012 (NL) ...................................... 2008090

(51) Int. Cl.
*C02F 1/46* (2006.01)
*C25B 1/00* (2006.01)
(Continued)

(52) U.S. Cl.
CPC .................. *C25B 1/00* (2013.01); *C01B 5/00* (2013.01); *C02F 3/005* (2013.01); *C25B 1/02* (2013.01);
(Continued)

(58) Field of Classification Search
CPC .... C25B 1/02; C25B 1/00; C25B 9/10; C25B 5/00; C01B 5/00; C02F 13/005;
(Continued)

(56) References Cited

U.S. PATENT DOCUMENTS

| | | | |
|---|---|---|---|
| 6,531,050 | B1 | 3/2003 | Waite |
| 2011/0076519 | A1 | 3/2011 | Chandran et al. |

(Continued)

FOREIGN PATENT DOCUMENTS

| | | |
|---|---|---|
| DE | 10138966 A1 | 2/2003 |
| JP | 3530511 B2 | 5/2004 |

(Continued)

OTHER PUBLICATIONS

Kuntke et al., "Effects of ammonium concentration and charge exchange on ammonium recovery from high strength wastewater using a microbial fuel cell," Bioresource Technology, 2011, p. 4376-4382, 102, Elsevier Ltd.

(Continued)

*Primary Examiner* — Arun S Phasge
(74) *Attorney, Agent, or Firm* — Harness, Dickey & Pierce, P.L.C.

(57) ABSTRACT

A method is disclosed for nitrogen recovery from an ammonium including fluid and a bio-electrochemical system for the same. In an embodiment, the method includes providing an anode compartment including an anode; providing a cathode compartment including a cathode, wherein the compartments are separated by at least one ion exchange membrane; providing the ammonium comprising fluid in the (Continued)

anode compartment and a second fluid in the cathode compartment; applying a voltage between the anode and the cathode; and extracting nitrogen from the cathode compartment.

19 Claims, 7 Drawing Sheets

(51) Int. Cl.
| | |
|---|---|
| *C25B 5/00* | (2006.01) |
| *C25B 1/02* | (2006.01) |
| *C02F 3/00* | (2006.01) |
| *C01B 5/00* | (2006.01) |
| *C25B 9/10* | (2006.01) |
| *H01M 8/22* | (2006.01) |
| *H01M 8/1018* | (2016.01) |
| *H01M 8/124* | (2016.01) |
| *C02F 1/467* | (2006.01) |
| *C02F 101/16* | (2006.01) |

(52) U.S. Cl.
CPC .................. *C25B 5/00* (2013.01); *C25B 9/10* (2013.01); *C02F 1/4676* (2013.01); *C02F 2101/16* (2013.01); *C02F 2201/4619* (2013.01); *C02F 2201/46115* (2013.01); *H01M 8/222* (2013.01); *H01M 2008/1095* (2013.01); *H01M 2008/1293* (2013.01); *Y02E 60/366* (2013.01)

(58) Field of Classification Search
CPC .......... C02F 1/4676; C02F 2201/46115; C02F 2101/16; C02F 2201/4619; Y02E 60/366; Y02E 60/566; Y02E 60/525; H01M 2008/1293; H01M 2008/1095; H01M 8/222

See application file for complete search history.

(56) References Cited

U.S. PATENT DOCUMENTS

| | | | |
|---|---|---|---|
| 2011/0243823 | A1 | 10/2011 | Botte |
| 2011/0266159 | A1* | 11/2011 | Umimoto ............. C02F 1/4674 205/748 |
| 2011/0302909 | A1 | 12/2011 | Botte |
| 2011/0315561 | A1 | 12/2011 | Rabaey et al. |

FOREIGN PATENT DOCUMENTS

| | | |
|---|---|---|
| JP | 2010-174333 A | 8/2010 |
| WO | WO-0056666 A1 | 9/2000 |
| WO | WO-2009046417 A1 | 4/2009 |
| WO | WO-2010042987 A1 | 4/2010 |
| WO | WO-2011062485 A2 | 5/2011 |
| WO | WO-2011123620 A1 | 10/2011 |

OTHER PUBLICATIONS

International Search Report PCT/ISA/210 for International Application No. PCT/NL2013/050012 dated Oct. 1, 2013.

* cited by examiner

METHOD FOR NITROGEN RECOVERY FROM AN AMMONIUM COMPRISING FLUID AND BIO-ELECTROCHEMICAL SYSTEM

The invention relates to a method for nitrogen recovery from an ammonium comprising fluid. Such methods extract nitrogen from a fluid, for example in the form of molecular nitrogen ($N_2$) or ammonia ($NH_3$). This is for instance important in waste water treatment plants, since ammonium is considered a pollutant.

A conventional method for recovering nitrogen involves the use of a $NH_3$ stripper. This device is similar to a gas scrubber. The ammonium comprising fluid is brought into contact with a counter flowing gas stream, which strips the ammonium from the water in the form of ammonia. However, this process is energy intensive and furthermore requires large amounts of chemicals.

A goal of the invention is to prevent or at least reduce the above disadvantages and to provide a method for nitrogen recovery from an ammonium comprising fluid which is energy efficient.

This goal is achieved by the method for nitrogen recovery from an ammonium comprising fluid according to the invention, comprising providing an anode compartment comprising an anode;
providing a cathode compartment comprising a cathode, wherein the compartments are separated by at least one ion exchange membrane;
providing the ammonium comprising fluid in the anode compartment and a second fluid in the cathode compartment;
applying a voltage between the anode and the cathode; and
extracting nitrogen from the cathode compartment.

In the context of the invention the term "ammonium" will be understood as $NH_4^+$ ions, the term "molecular nitrogen" will be understood as $N_2$, and "ammonia" will be understood as $NH_3$ (for example in the gas phase (g) or in solution (aq)). The term "nitrogen recovery" will be understood as the recovery of a nitrogen comprising compound, such as molecular nitrogen or ammonia ($NH_3$). Ammonium-nitrogen will be understood as nitrogen in the form of $NH_4^+$ and/or $NH_3$.

Ammonium ions will be transported from the anode compartment through the ion exchange membrane. Furthermore, $H^+$ ions will be consumed at the cathode, for example by reduction to hydrogen. Due to this $H^+$ ion consumption at the cathode the pH of the cathode compartment will increase. This enables the volatilisation and recovery of nitrogen by the formation of ammonia according to the following reaction:

$$NH_4^+ + OH^- \rightarrow NH_3 + H_2O.$$

The ammonia ($NH_3$) can be extracted from the cathode compartment, by purging with a gas stream, such as $O_2$ or $H_2$:

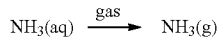

Therefore, ammonium nitrogen is recovered in a energy efficient way. Furthermore, no addition of chemicals is required to increase the pH.

The at least one ion exchange membrane is for example a cation exchange membrane (CEM), an anion exchange membrane (AEM), a bipolar exchange membrane (BEM) or a charge mosaic membrane (CMM). Preferably, the membrane separating the anode compartment from the cathode compartment comprises a CEM, since transfer of $NH_4^+$ from the anode compartment is most efficient using a CEM.

Preferably, the applied voltage is in the range of 10 mV-50 V, more preferably 50 mV-10 V and most preferably 100 mV-5 V, for example 1V-2V.

The voltage preferably is a DC voltage.

Preferably, the method according to the invention comprises the step of providing a bio-electrode as the anode and/or the cathode.

In other words, the anode and cathode are provided as components of a bio-electrochemical system. Conventionally, bio-electrochemical systems are divided into two classes, namely microbial electrolysis cells (MECs) and microbial fuel cells (MFCs).

In conventional MECs a voltage is applied for electrolysis of water to produce $H_2$. Usually the anode is provided as a bio-electrode to oxidize organic compounds for electron production. The electrons are used to reduce protons ($H^+$ ions) at the cathode to hydrogen. The goal of MECs is to produce a product at the cathode, in most cases hydrogen. In contrast, the method according to the invention is aimed at nitrogen recovery, for example in the form of ammonia or molecular nitrogen.

In conventional microbial fuel cells (MFCs) the organic compounds are consumed by the bacteria to produce (bio-anode) and/or consume (bio-cathode) electrons to produce a current. In other words, the goal in conventional MFCs is to produce electricity. In contrast, the invention is aimed at nitrogen recovery.

Furthermore, conventional MFCs do not apply a voltage between the anode and the cathode, such as in the method according to the invention.

Therefore, it is noted that the denominators MEC and MFC are strictly not appropriate for the components provided by the method according to the invention, since the method is aimed at nitrogen recovery instead of hydrogen or electricity production only, and a voltage is applied between the anode and the cathode. Therefore, the more general term bio-electrochemical system will be used, i.e. a bio-electrochemical system is any system wherein micro-organisms, such as bacteria, produce or consume electrons. In particular, bio-electrochemical systems comprise systems comprising one or more bio-electrodes.

The bio-electrode is an anode provided with micro-organisms, such as bacteria, for example in the form of a biofilm on the electrode.

The micro-organisms of the bio-electrode catalyze the reactions at the anode and/or cathode, thereby improving the energy efficiency.

Preferably the anode is provided as a bio-electrode.

The bacteria of the bio-electrode catalyze the anodic reaction. This improves the energy efficiency.

Due to the oxidation of organic compounds at the anode the nitrogen recovery of the method according to the invention is even more efficient. The electrons produced by the bacteria lower the voltage which has to be applied across the anode and the cathode thereby decreasing the power consumption of the system and leading to an efficient method.

Furthermore, the method according to the invention has the advantage that no chemicals are required for increasing the pH at the cathode.

For example, the organic compound comprises acetate or other fatty acids, creatinine, organic acids, creatine or sugars. Complex organic compounds can be broken down stepwise by the bacteria of the bio-electrode.

For example, the oxidation reaction of acetate at a bio-anode is given by:

$$CH_3COO + 4H_2O \rightarrow 2HCO_3^- + 9H^+ + 8e^-.$$

So, for each mole of acetate, eight moles of electrons are produced by the bacteria. Preferably, the ammonium comprising fluid of the method comprises the organic compounds which can be oxidized by the bacteria of the bio-electrode, for example the fluid comprises a waste water stream. Alternatively, organic compounds can be added to the ammonium comprising fluid.

At least some of the protons produced at the anode, for example due to the above reaction, will pass through the membrane to the cathode compartment. This increases the production of $NH_3$, $N_2$ and/or $H_2$.

Preferably, a bio-anode is provided in an anaerobic anode compartment.

Preferably, the method of the invention comprises controlling the voltage to control ion transport rates. By increasing the voltage between anode and cathode, the current density increases and therefore the ion transport increases. This leads to an increased ammonium transport. Therefore, by investing a bit more energy via an increased voltage a higher recovery can be achieved. Thus, by controlling the voltage, the recovery rate and energy expenditure can be controlled.

The method according to the invention can be combined with other treatment methods, for example as a pre- or post-treatment. For example, the method according to the invention is combined with an MAP (magnesium ammonium phosphate) precipitation process. A fluid, preferably urine or a urine comprising fluid, is first treated with the MAP process, thereby removing phosphorus from the fluid. The supernatant of the MAP process is subsequently treated with the method according to the invention, for efficient removal of nitrogen from the fluid.

Preferably, the method according to the invention comprises the step of providing the fluid in the cathode compartment with a pH above 7, preferably above 8, more preferably above 9, most preferably above 10.

As mentioned above the pH at the cathode will naturally increase due to $H^+$ consumption at the cathode. In the method according to the invention this increase in pH is not counteracted, as for example is common practice with MECs or MFCs. Furthermore, the step of providing the fluid with an increased pH may comprise actively increasing the pH of the fluid, for example by adding sodium hydroxide (NaOH).

The relatively high pH at the cathode enables the recovery of nitrogen according to the reaction:

$$NH_4^+ + OH^- \rightarrow NH_3 + H_2O.$$

In a preferred embodiment according to the invention, extracting the nitrogen comprises extracting ammonia, and the method further comprises the step of feeding the ammonia to a fuel cell.

In this embodiment the nitrogen is extracted at least in the form of ammonia ($NH_3$), for example in the form of ammonia gas. The ammonia is extracted and fed to a fuel cell. Two situations are distinguished.

In the first situation both hydrogen gas and ammonia are produced in the cathode compartment. The ammonia is produced according to the above reaction and the hydrogen is produced by reduction of $H^+$ ions at the cathode. For example, the fuel cell is a proton exchange membrane fuel cell or a solid oxide fuel cell (SOFC), or two separate fuel cells are provided, one being a hydrogen fuel cell and one being an ammonia fuel cell.

Surprisingly, the energy content of the fuel produced exceeds the energy requirement of the voltage supply, thereby resulting in a net energy gain. For example, the voltage supply can be powered by the fuel cell and the surplus can be used for other purposes.

In the second situation the fluid in the cathode compartment comprises oxygen ($O_2$) or preferably, oxygen is supplied to the cathode compartment. The $H^+$ ions can react with the available oxygen ($O_2$) to form water ($H_2O$) instead of hydrogen, and the output of the cathode compartment will substantially comprise ammonia, which can be fed to an ammonia fuel cell.

It is noted that no pre-treatment of the ammonia is required prior to electricity production.

In an alternative preferred embodiment according to the invention extracting the nitrogen comprises extracting molecular nitrogen ($N_2$) and the method further comprises the step of providing an additional anode.

The effect of the additional anode is that ammonia is decomposed to molecular nitrogen and, depending on the configuration, hydrogen or water.

Preferably, but not necessarily, the anode and the additional anode are separated from each other by an ion exchange membrane.

Preferably the anode and the additional anode are kept at substantially the same potential with respect to the cathode, for example by connecting them is parallel.

Optionally the additional anode is a bio-anode.

The additional anode may be arranged in the cathode compartment or in an additional compartment.

When the additional anode is provided in the cathode compartment, in other words, the anode is provided in an anode compartment which is separated from the cathode compartment by a ion exchange membrane and the cathode compartment comprises both the additional anode and the cathode, the ammonia will be oxidized at the additional anode according to the following reaction:

$$2NH_3 \rightarrow N_2 + 6H^+ + 6e^-.$$

At the cathode protons will be reduced to hydrogen gas. Therefore, both molecular nitrogen ($N_2$) and hydrogen ($H_2$) are produced in the cathode compartment.

Preferably, the method comprises extracting the molecular nitrogen and hydrogen separately. The molecular nitrogen will be produced at the additional anode and can therefore be extracted from an outlet in the vicinity of the additional anode. On the other hand, the hydrogen gas will be produced at the cathode and therefore preferably the hydrogen gas is extracted from an outlet in the vicinity of the cathode.

In an alternative preferred embodiment the method according to the invention further comprises the steps of:
providing an additional compartment between the anode compartment and the cathode compartment and arranging the additional anode in the additional compartment;
separating the anode compartment from the additional compartment by a first ion exchange membrane; and
separating the additional compartment from the cathode compartment by a second ion exchange membrane.

By providing an additional compartment between the anode compartment and the cathode compartment different reactions at the additional anode and at the cathode can be obtained compared to the above embodiment in which both electrodes are in the cathode compartment. Preferably, hydroxyl ions ($OH^-$) produced at the cathode pass through the second ion exchange membrane to the additional compartment comprising the additional anode. In the additional compartment ammonia is decomposed into molecular nitrogen and protons according to $2NH_3 \rightarrow N_2 + 6H^+ + 6e^-$. For every mole of $NH_3$, three moles of electrons are formed. The $H^+$ ions react with the hydroxide ($OH^-$) to form $H_2O$. Therefore, nitrogen is extracted in the form of molecular nitrogen (gas) and furthermore water is produced. Both substances are environmentally friendly.

Preferably the first membrane is a Cation Exchange Membrane. Preferably the second membrane, i.e. the membrane between the cathode compartment and the additional compartment, is an Anion Exchange Membrane.

In a further preferred embodiment according to the invention the method comprises the step of feeding fluid from the anode compartment to the compartment comprising the additional anode.

The additional anode decomposes ammonia from the fluid in the compartment with the additional anode, i.e. the cathode compartment or the additional compartment. By feeding at least a part of the fluid from the anode compartment to this compartment remaining ammonia in the anode compartment's effluent can be decomposed in the compartment comprising the additional anode. Preferably the fluid or part of the fluid from the anode compartment is fed periodically to the compartment comprising the additional anode.

In a preferred embodiment according to the invention the method comprises the step of supplying oxygen to the cathode compartment.

By supplying oxygen ($O_2$) to the cathode compartment water ($H_2O$) can be formed due to a reaction between the oxygen ($O_2$), electrons ($e^-$) and $H^+$ ions. This is an advantage for example in the case one is only interested in producing an ammonium reaction product, such as ammonia ($NH_3$) or nitrogen ($N_2$), but no hydrogen production is desired. Due to the reaction of protons with oxygen, water will be produced at the cathode instead of hydrogen. Furthermore, $O_2$ reduction requires less energy than $H^+$ reduction, thus further increasing the energy efficiency of the method according to the invention.

Furthermore, current densities are increased and as a result the transport rate of $NH_4^+$ ions is increased.

Preferably, the method according to the invention comprises providing a urine comprising fluid as ammonium comprising fluid, preferably the urine concentration is high, most preferably 100%.

Urine comprises relatively high levels of nitrogen in the form of urea. Urea decomposes to ammonia and ammonium. For example, waste water treatment plants have to remove considerable amounts of ammonium and ammonia due to urine. In particular since approximately 80% of nitrogen in waste water originates from urine. The method according to the invention is in particular suitable for this task.

Preferably, the method comprises the step of collecting urine separated from other waste stream fluids, such that a separate treatment of the urine is possible. It is noted that urine comprises furthermore several organic compounds, such as fatty acids, organic acids, proteins, polysaccharides and lipids for example. The typical amount of oxidizable organic compounds in urine is as high as 10 g/L. With the method according to the invention, wherein a bio-electrode is used, such compounds can be biologically oxidized, and in addition electrons are produced in this process. This leads to an effective treatment of waste water. Furthermore, treatment of the ammonium comprising fluid, such as waste water, is sustainable. Energy can be gained from the process, and COD and nitrogen are removed from the fluid.

In a preferred embodiment according to the present invention the method comprises providing an ammonium comprising fluid having an ammonium-nitrogen concentration ≥0.5 g/l, preferably >1 g/l, more preferably >5 g/l and most preferably >10 g/l.

The invention further relates to a bio-electrochemical system for nitrogen recovery from an ammonium comprising fluid, comprising
an anode compartment comprising an anode;
a cathode compartment comprising a cathode;
wherein the compartments are separated by at least one ion exchange membrane;
a power supply connected to the anode and the cathode; and
an additional anode.

For example, the power supply comprises a voltage supply or a current source.

The same effects and advantages as described above for the method for nitrogen recovery apply with respect to the bio-electrochemical system.

At the additional anode, ammonia decomposes into nitrogen and protons which can be reduced to obtain molecular nitrogen and water or molecular nitrogen and hydrogen.

Optionally, the anode and/or cathode is provided as a membrane electrode assembly (MEA). This is particularly advantageous when oxygen supply is desired.

In a first preferred embodiment according to the invention the additional anode of the bio-electrochemical system is arranged in the cathode compartment.

In a second embodiment according to the invention an additional compartment is arranged between the anode compartment and the cathode compartment, wherein the additional compartment comprises the additional anode and the anode compartment is separated from the additional compartment by a first ion exchange membrane and the additional compartment is separated from the cathode compartment by a second ion exchange membrane.

In a further preferred embodiment according to the invention the system comprises a gas outlet that is connected to a fuel cell.

In particular in the case hydrogen is produced with the bio-electrochemical system the connection to the fuel cell enables converting the hydrogen to electricity. The produced energy can be used as a power supply for the bio-electrochemical system. Preferably the power supply of the system according to the invention is formed by the fuel cell, i.e. no separate power supply is required. Alternatively, the fuel cell functions as an additional power supply.

Alternatively, a bio-electrochemical system for nitrogen recovery from an ammonium comprising fluid, comprises an anode compartment comprising an anode, a cathode compartment comprising a cathode, wherein the compartments are separated by at least one ion exchange membrane, a power supply connected to the anode and the cathode and a gas outlet that is connected to a fuel cell.

In a further preferred embodiment according to the invention a fluid outlet of the anode compartment is connected to a fluid inlet of the compartment that comprises the additional anode, i.e. the cathode compartment or the additional compartment.

By providing at least a part of the fluid of the anode compartment to the fluid which surrounds the additional anode, any remaining ammonia in the fluid of the inlet compartment can be decomposed by the additional anode. Preferably, the connection comprises a valve coupled to a control mechanism for periodically feeding the fluid from the anode compartment to the cathode compartment or additional compartment.

Preferably, the system according to the invention is used to perform the method according to the invention.

Further advantages and details of the invention are elucidated using the accompanying drawings, wherein.

Figure 1:
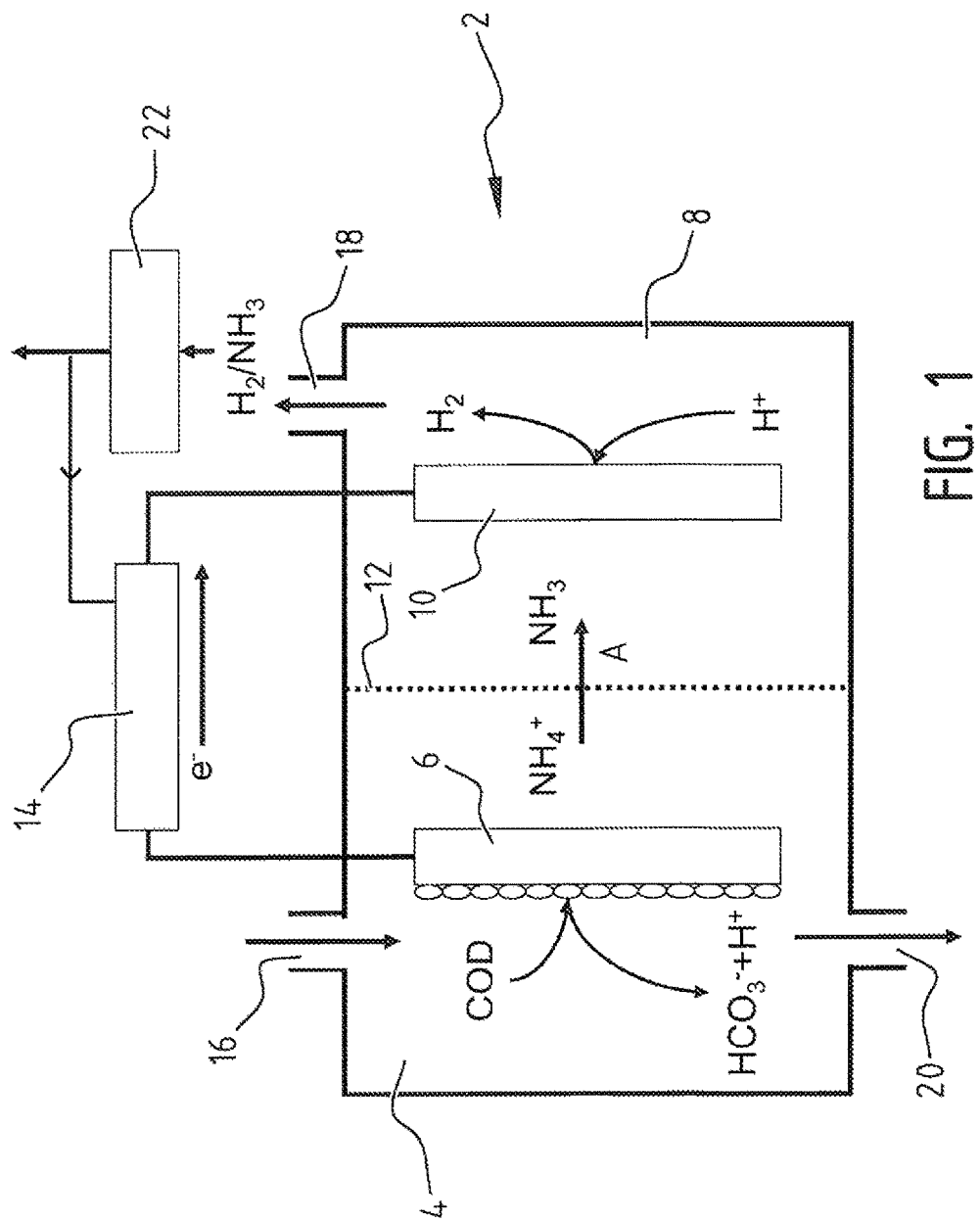
FIG. 1 illustrates a first embodiment of the method according to the invention, wherein hydrogen and ammonia are produced.
Figure 2:
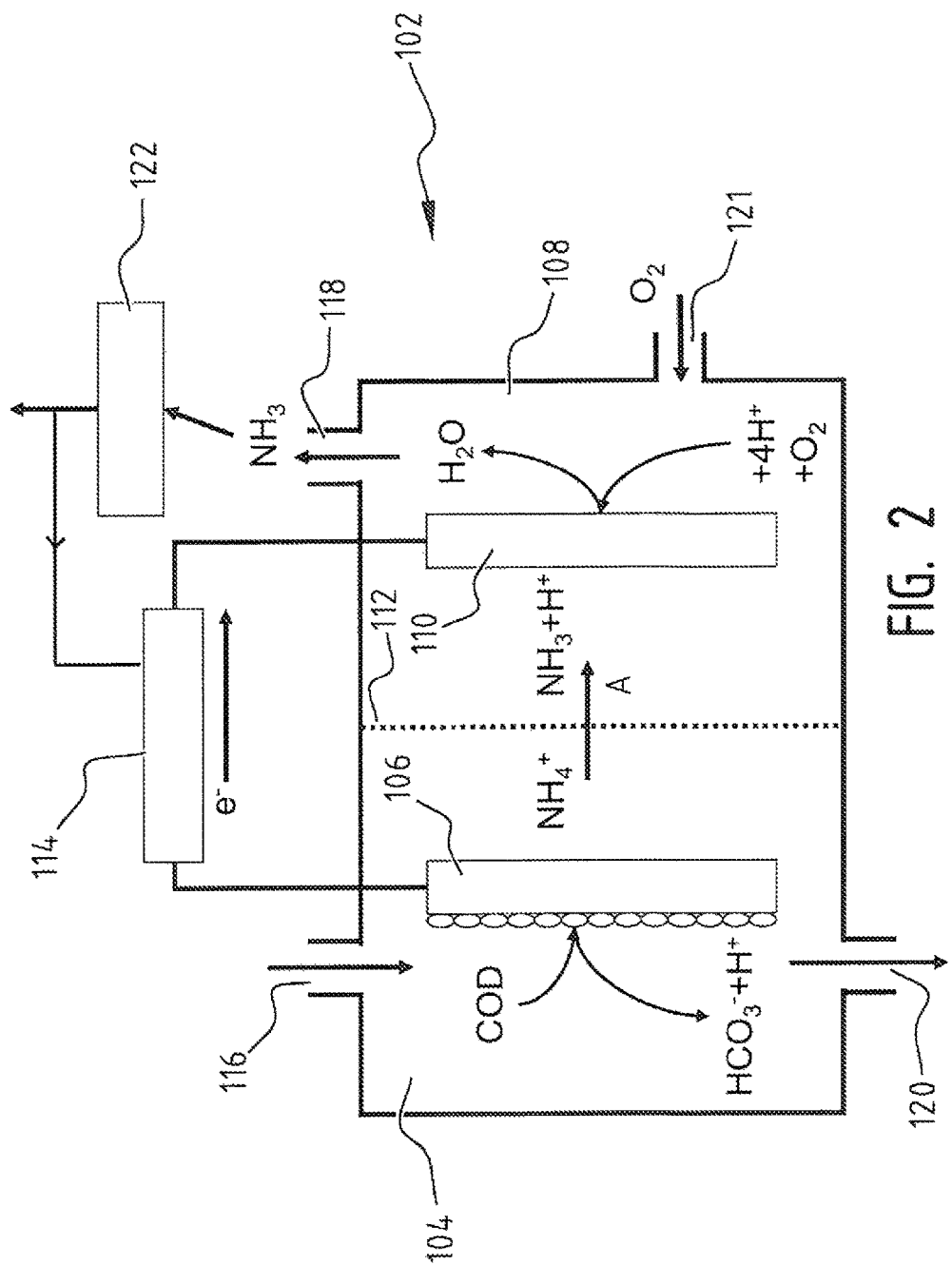
FIG. 2 illustrates a second embodiment of the method according to the invention wherein ammonia is produced.

In FIGS. 1-5, similar components have been given the same reference numeral increased with a hundreds, e.g. element 14 in FIG. 1 is similar to element 114, 214, 314, 414 in FIGS. 2, 3, 4 and 5 respectively.

A first bio-electrochemical system 2 (FIG. 1) comprises an anode compartment 4 with a bio-anode 6 and a cathode compartment 8 with a cathode 10. The anode compartment 4 and the cathode compartment 8 are separated by a cation exchange membrane 12. The bio-anode 6 and the cathode 10 are connected with a power supply 14.

The anode compartment 4 comprises an inlet 16 for supplying urine to the anode compartment 4, as indicated with the arrow. The cathode compartment 8 comprises an outlet 18 for extraction of a hydrogen ammonia mixture ($H_2/NH_3$). The anode compartment comprises an outlet 20 for releasing effluent. Preferably, the effluent is released periodically, for example by means of a valve controlled by a control mechanism. The effluent is optionally fed to a system for removal of phosphorus. This is in particular efficient due to the low carbonate/bicarbonate concentration of the effluent. Furthermore, the low pH of the anode is beneficial for phosphorus recovery, since carbonate ($CO_3^{2-}$) can be easily stripped as $CO_2$ at a low pH:

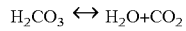

$H_2CO_3 \leftrightarrow H_2O + CO_2$

$H_2CO_3 \leftrightarrow HCO_3^- + H^+ (pKa=6.3)$

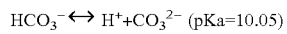

$HCO_3^- \leftrightarrow H^+ + CO_3^{2-} (pKa=10.05)$

Less carbonate in the solution means that less calcium carbonate ($CaCO_3$) will be formed during the recovery of phosphate as a calcium phosphate (e.g. hydroxyapatite, $Ca_5(PO_4)_3(OH)$). Therefore, phosphate recovery becomes more efficient.

The outlet 18 of the cathode compartment 8 is connected to a fuel cell 22 for the production of electricity. The amount of power produced by fuel cell 22 exceeds the power consumption of power supply 14 and a part of the produced power is directed to the power supply 14 to power the process.

The urine supplied to the anode compartment 4 via inlet 16 comprises ammonium ions ($NH_4^+$) and organic compounds (COD), such as acetate ions ($CH_3COO^-$). The bacteria of the bio-anode 6 will oxidize the acetate according to the following reaction:

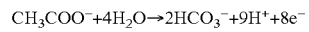

$CH_3COO^- + 4H_2O \rightarrow 2HCO_3^- + 9H^+ + 8e^-$

For every mole of acetate eight moles of electrons are produced at the bio-anode 6.

The power supply 14 connected to these electrodes provides an additional driving force for the ammonium transport from anode compartment 4 to the cathode compartment 8 (arrow A). Due to this added energy, higher current densities are achieved, which lead to a high ammonium transport. At the cathode 10 protons ($H^+$) are reduced to form hydrogen ($H_2$):

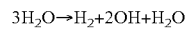

$3H_2O \rightarrow H_2 + 2OH^- + H_2O$

Due to the proton consumption of the cathode 10, the pH of the cathode compartment 8 increases. This enables the reaction of ammonium ions in the cathode compartment according to the reaction:

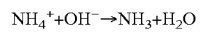

$NH_4^+ + OH^- \rightarrow NH_3 + H_2O$

Therefore, the produced hydrogen and ammonia can be extracted from outlet 18 and fed to a modified fuel cell 22. The modified fuel cell can produce electricity from both hydrogen and ammonia. Alternatively, the modified fuel cell is replaced by a solid oxide fuel cell (SOFC).

Bio-electrochemical system 102 (FIG. 2) comprises an anode compartment 104 with a bio-anode 106 and a cathode compartment 108 with a cathode 110. Again, the anode compartment 104 and cathode compartment 108 are separated by a cation exchange membrane 112. The anode 106 and cathode 110 are connected to a power supply 114. Urine is provided to the anode compartment 104 through inlet 116. Ammonia ($NH_3$) which is produced in the cathode compartment 108 is extracted through outlet 118. Effluent from the anode compartment 104 is released periodically via outlet 120.

The ammonia extracted via outlet 118 is fed to an ammonia fuel cell 122 to produce electricity. Again, the energy produced exceeds the energy requirement of the power supply 114 and a part of the electricity can be used to power the power supply 114. The cathode compartment 108 further comprises an inlet 121 for providing oxygen ($O_2$) to the fluid in the cathode compartment 108.

In the anode compartment 104 the same reactions take place as described with respect to FIG. 1. In the cathode compartment the availability of oxygen ($O_2$) enables a reaction at the cathode:

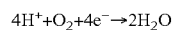

$4H^+ + O_2 + 4e^- \rightarrow 2H_2O$

Therefore, substantially no hydrogen is produced and the outlet 118 of the cathode compartment 108 releases predominantly ammonia.

The bio-electrochemical system 202 (FIG. 3) comprises an anode compartment 204 with a bio-anode 206, a second compartment 208 comprising a cathode 210 and an additional anode 211. The cathode 210 and the additional anode 211 are separated from the anode 206 by a cation exchange membrane 212. The anode 206, the cathode 210 and the additional anode 211 are connected to a power supply 214.

In this example, the voltage of the anode 206 and the additional anode 211 is substantially the same, since the anode 206 and additional anode 211 are connected in parallel. It is noted that this need not be the case and the voltage of the electrodes may be controlled individually according to the invention.

The anode compartment 204 comprises an inlet 216 for providing urine and the cathode compartment 208 comprises a first outlet 217 for releasing molecular nitrogen ($N_2$) and a second outlet 218 for releasing hydrogen ($H_2$). Furthermore the anode compartment 204 comprises an outlet 220 for periodically releasing effluent fluid.

The reactions in the anode compartment 204 are the same as described above. In the second compartment 208 an additional reaction occurs due to the additional anode 211. At the additional anode 211 the ammonia ($NH_3$) in the compartment 208 is decomposed according to the following reaction:

$2NH_3 \rightarrow N_2 + 6H^+ + 6e^-$.

At the cathode protons are oxidized to form hydrogen. Therefore in compartment 208, molecular nitrogen is formed at the additional anode 211 and hydrogen is formed at the cathode 210, such that outlet 217 substantially comprises $N_2$ (g) and outlet 218 substantially comprises $H_2$ (g).

Figure 3:
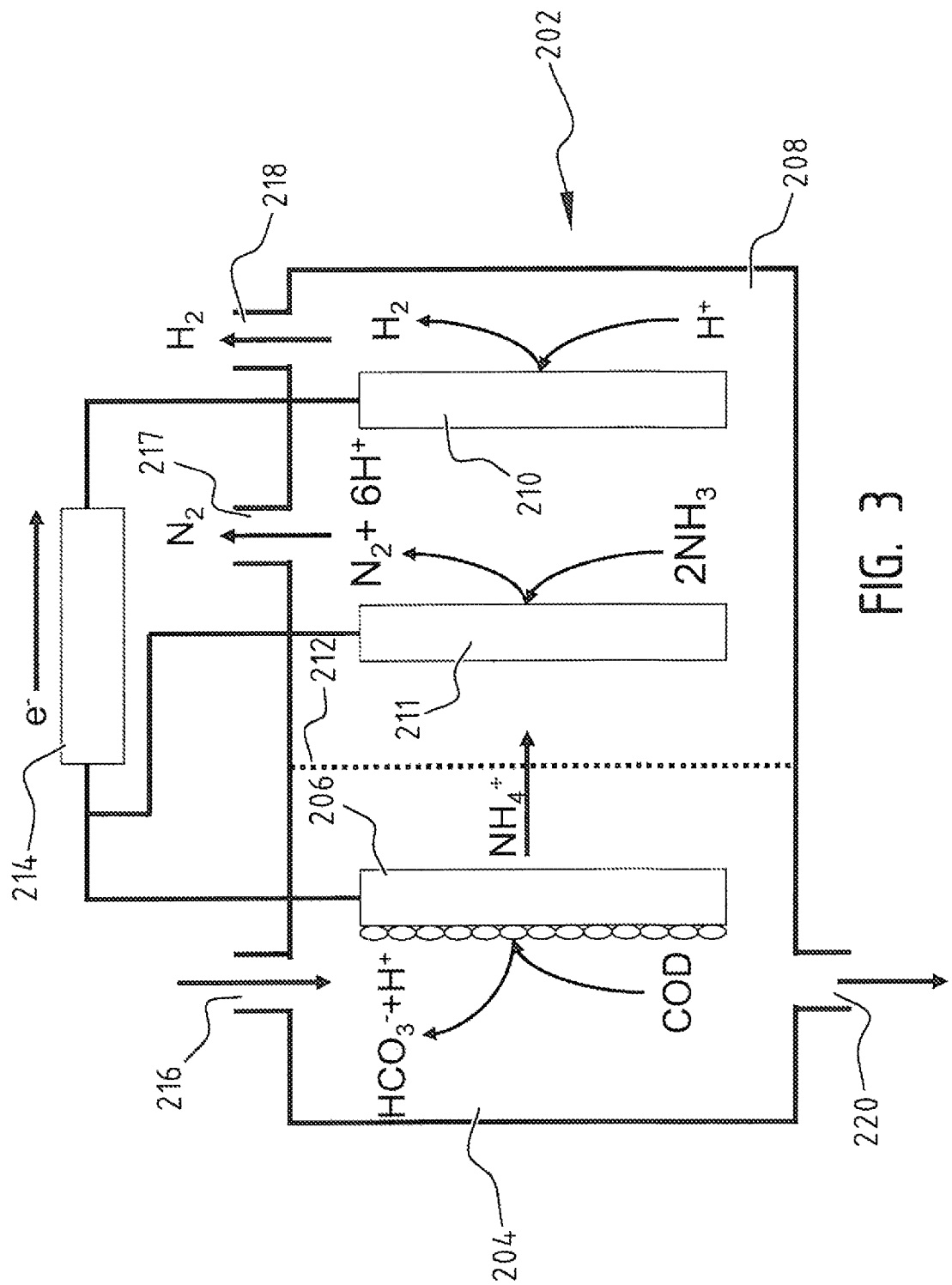
FIG. 3 illustrates a third embodiment of the method according to the invention wherein an additional anode in the cathode compartment is provided and molecular nitrogen and hydrogen are produced.
Figure 4:
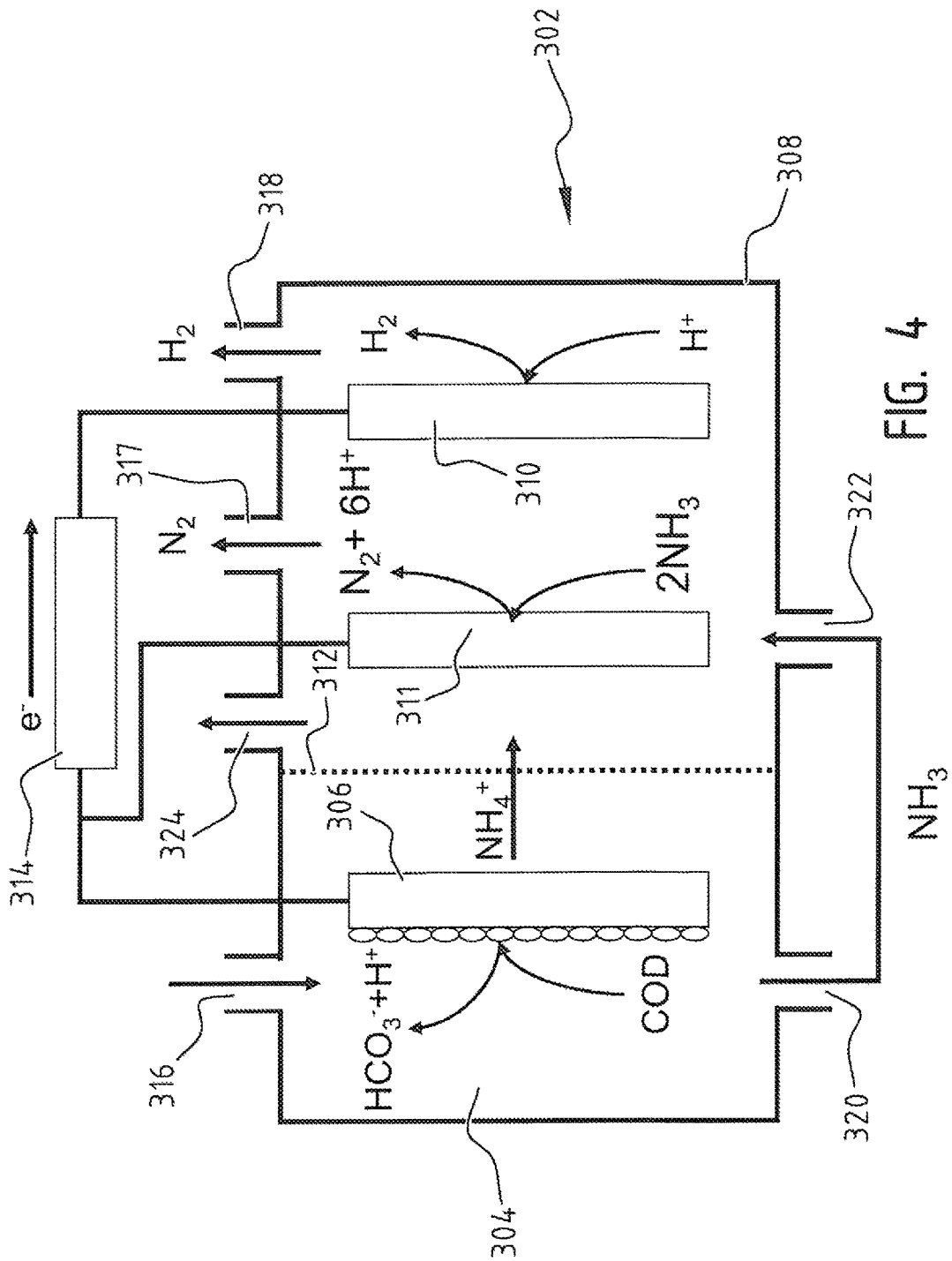
FIG. 4 illustrates a fourth embodiment of the method according to the invention, wherein an additional anode in the cathode compartment is provided and molecular nitrogen and hydrogen is produced.
Figure 5:
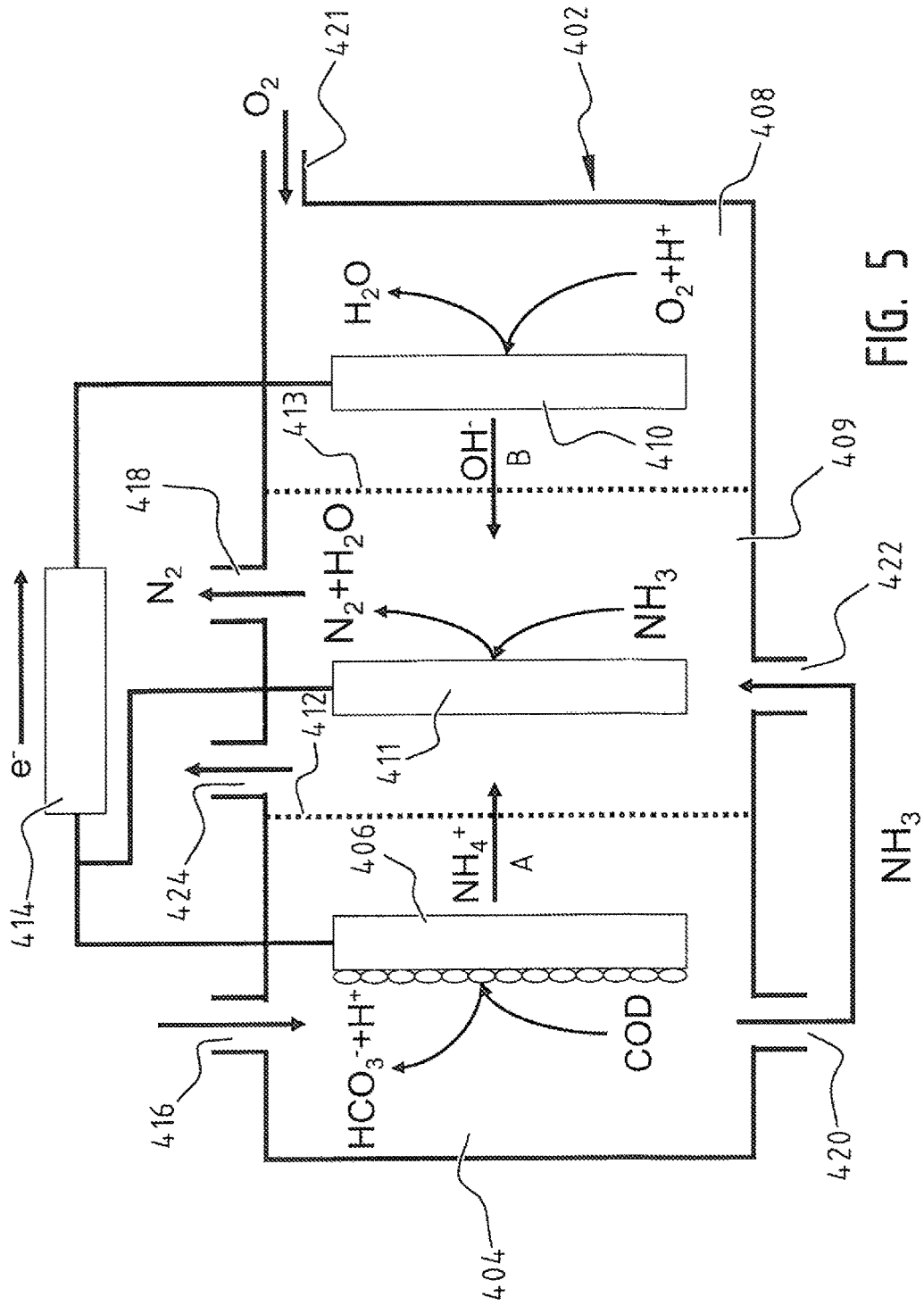
FIG. 5 illustrates a fifth embodiment of the method according to the invention wherein an additional compartment is provided and an additional anode is provided within this additional compartment.

Bio-electrical system 302 (FIG. 4) shows as a similar arrangement as in FIG. 3. A difference between the system of FIG. 3 and FIG. 4 is that in system 302 the second compartment 308 comprises an inlet 322 which is connected to outlet 320 of the anode compartment 304 such that effluent from the anode compartment 304 is directed into the second compartment 308. Preferably the fluid is fed periodically to the second compartment 308.

The effluent exiting the anode compartment 304 may still comprise some ammonia which can be further decomposed by exposing it to the additional anode 311 in the second compartment 308.

In system 402 (FIG. 5), three compartments are provided: an anode compartment 404 comprising a bio-anode 406, a cathode compartment 408 comprising a cathode 410 and an additional compartment 409 comprising an additional anode 411. The anode compartment 404 is separated from the additional compartment 409 by a cation exchange membrane 412 and the additional anode compartment 409 is separated from the cathode compartment 408 by an anion exchange membrane 413. Anode 406, anode 411 and cathode 410 are connected to power supply 414. Urine is provided via inlet 416. Nitrogen ($N_2$) is released via outlet 418.

The effluent from the anode compartment 404 is fed from the outlet 420 of the anode compartment 404 to the inlet 422 of the additional compartment 409. Fluid can exit the additional compartment 409 via outlet 424. Furthermore, the cathode compartment 408 comprises an inlet 421 for $O_2$ supply.

In the cathode compartment oxygen ($O_2$) and protons ($H^+$) form water ($H_2O$). Hydroxide ions ($OH^-$) pass through the anion exchange membrane 413 (arrow B). Therefore, no hydrogen is produced and all the ammonia in the urine is decomposed into water and molecular nitrogen $N_2$ (g), which exits via outlet 418.

Optionally, cathode compartment 408 comprises an outlet for surplus gas.

Figure 6:
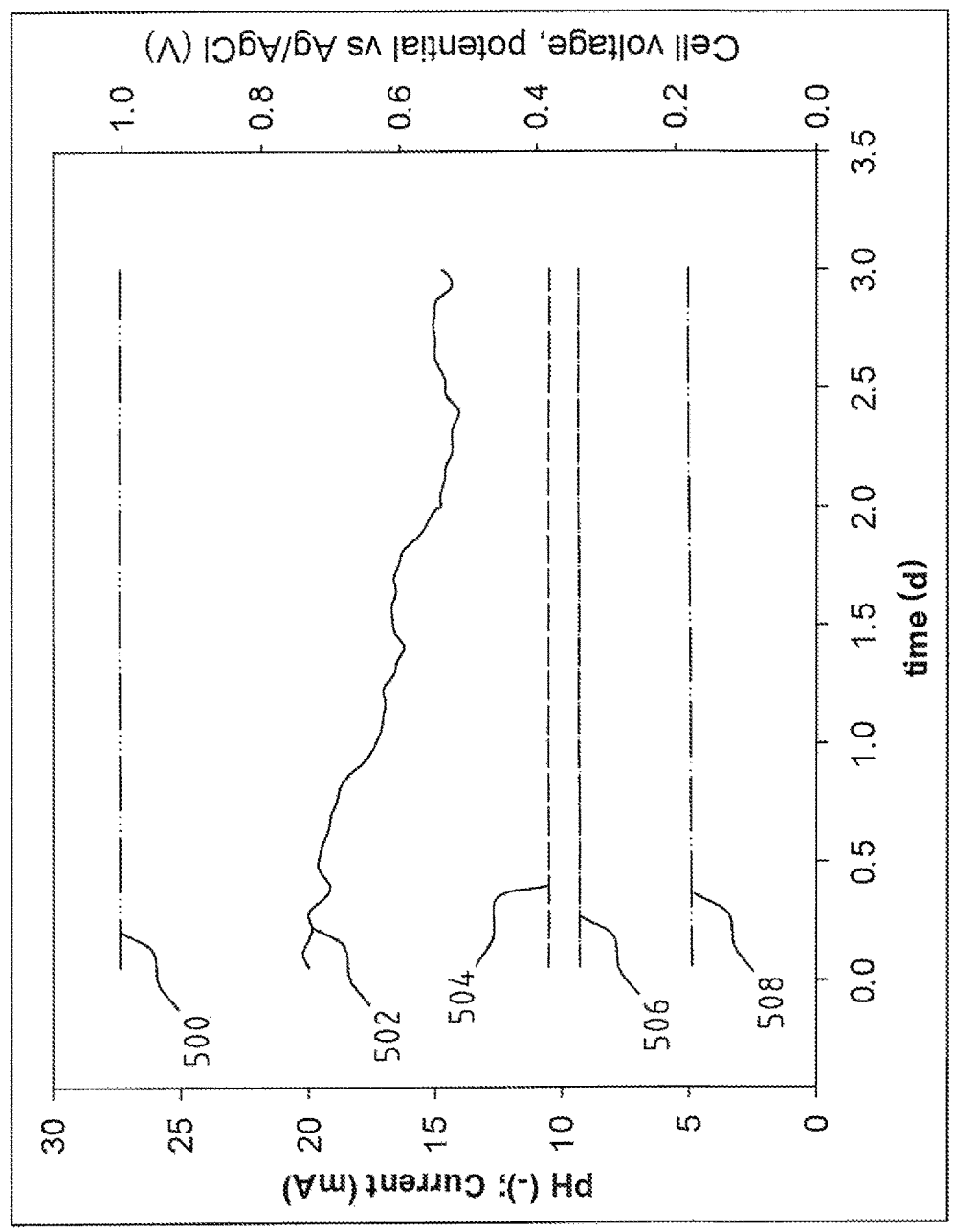
FIG. 6 shows experimental results in the form of a graph of pH, current and cell voltage over time.

An experiment has been performed using system 202 of FIG. 3. The system was operated for three days on real urine and produced 678.08 ml of gas, composed of 86% $H_2$, 0.05% $O_2$ and 6% $N_2$. The graph of FIG. 6 shows further results of the experiment. The potential of the anode and the cathode was measured relative to a Ag/AgCl reference electrode. The graph shows a constant voltage level during the 3 days for both the anode ($E_{anode}$), graph 508, as the system ($E_{cell}$), graph 500. The current, graph 502, dropped slightly during three days operation. The pH levels of the anode, graph 506, and cathode, graph 504, are constant. Furthermore, ammonia was recovered in the experiment. In a further experiment, the system was operated stably for more than 270 days.

In a further experiment, $H_2$ and $NH_3$ was produced using bio-electrochemical system 2 of FIG. 1. The experiments were conducted using different types of membranes. The results are shown in the table below.

| Membrane type | COD in (mg/L) | i (A/m$^2$) | η CE (%) | N removal (%) | η H$_2$ (%) |
|---|---|---|---|---|---|
| AEM (s) | 475.7 | 28.27 | 95.78 | 1.88 | 94.06 |
| CEM (s) | 480.2 | 8.07 | 87.13 | 18.21 | 86.9 |
| CEM (r) | 700.8 | 15.74 | 99.5 | 32.6 | 86 |
| CEM (r) | 658 | 22.61 | 99.1 | 34.3 | 90.9 |

The first column of the table shows the membrane type: cation exchange membrane (CEM) (membrane 12) or anion exchange membrane (AEM) (instead of membrane 12). The column further denotes whether synthetic wastewater (s) or real wastewater (r) was used. In this case, the real wastewater was urine.

The second column shows the chemical oxygen demand (COD) of the fluid in mg/L. COD is a sum parameter of the oxidizable compounds in the fluid.

The third column shows the current density (i) in A/m$^2$.

The fourth column shows the Coulombic efficiency (η CE), which is the efficiency of conversion of COD to electrons.

The fifth column shows the nitrogen removal from the influent as a percentage.

The last column shows the hydrogen efficiency (η $H_2$), which is the efficiency of current to hydrogen gas.

It is noted that the use of a CEM is particularly advantageous for removing nitrogen from a fluid, as a high removal is achieved at relatively low current densities, while at the same time providing a high hydrogen efficiency.

Figure 7:
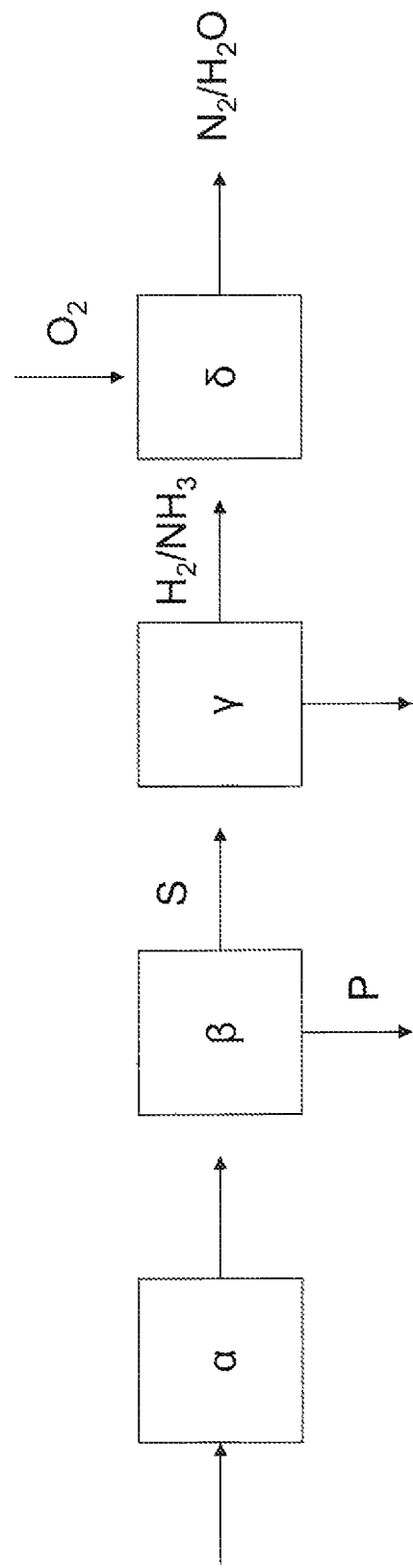
FIG. 7 shows a block diagram of a combination of an MAP process and the method according to the invention.

The method according the invention is advantageously combined with further treatment steps. For example, the method according to the invention is combined with a Magnesium Ammonium Phopsphate (MAP) precipitation process (FIG. 7).

Urine is supplied to a short term storage α, which enables hydrolysis of urea to form $NH_3$. Furthermore, storage α serves as a buffer to regulate the inflow to the system. From storage α the urine flows to a struvite reactor β, wherein magnesium phosphate ammonium (MAP), $MgNH_4PO_4 \cdot 6H_2O$, is formed. For example, $NH_4^+$, $Mg^{2+}$ and $PO_4^{3-}$ react at elevated pH to form MAP. The precipitated MAP is extracted, as indicated by the arrow P, and can for example be used as a fertilizer. Therefore, in this first treatment step, both ammonium and phosphorus are removed from the fluid. However, not all ammonium will be precipitated.

The supernatant effluent from reactor β is fed to reactor γ, in which the method according the invention is applied. In this example, reactor γ corresponds to the system described in relation to FIG. 1, i.e. a bio-electrochemical system for $NH_3/H_2$ production. However, instead of this system, any other system and method according to the invention can be used for reactor γ.

The treated urine leaving reactor γ will be depleted from nitrogen, COD and phosphorus. The hydrogen/ammonia mixture is fed to a solid oxide fuel cell (SOFC) δ. Also oxygen is supplied to fuel cell δ. Other types of fuel cells may be used as well, in particular when a different method according to the invention is used in reactor Y.

Energy will be produced in system δ and the end products are $N_2$ and $H_2O$, which are harmless to the environment.

The present invention is by no means limited to the above described embodiments thereof. The rights sought are defined by the following claims within the scope of which many modifications can be envisaged. For example, the method according to the invention may be operated batch-wise or continuously on an ammonium comprising fluid.

The invention claimed is:

1. Method for nitrogen recovery from an ammonium comprising fluid, comprising:
   providing an anode compartment comprising an anode;
   providing a cathode compartment comprising a cathode, wherein the compartments are separated by at least one ion exchange membrane;
   providing the ammonium comprising fluid in the anode compartment and a second fluid in the cathode compartment;
   applying a voltage between the anode and the cathode; and
   extracting nitrogen from the cathode compartment.

2. Method according to claim 1, comprising the step of providing a bio-electrode as the anode and/or the cathode.

3. Method according to claim 1, comprising the step of providing the fluid in the cathode compartment with a pH above 7.

4. Method according to claim 3, comprising the step of providing the fluid in the cathode compartment with a pH above 8.

5. Method according to claim 4, comprising the step of providing the fluid in the cathode compartment with a pH above 10.

6. Method according to claim 1, wherein extracting the nitrogen comprises extracting ammonia, the method further comprising the step of feeding the ammonia to a fuel cell.

7. Method according to claim 1, wherein extracting the nitrogen comprises extracting molecular nitrogen, the method further comprising the step of providing an additional anode.

8. Method according to claim 7, wherein providing an additional anode comprises providing the additional anode in the cathode compartment.

9. Method according to claim 7, further comprising the steps of:
   providing an additional compartment between the anode compartment and the cathode compartment and arranging the additional anode in the additional compartment;
   separating the anode compartment from the additional compartment by a first ion exchange membrane; and
   separating the additional compartment from the cathode compartment by a second ion exchange membrane.

10. Method according to claim 7, comprising the step of feeding fluid from the anode compartment to the compartment comprising the additional anode.

11. Method according to claim 1, comprising the step of supplying oxygen to the cathode compartment.

12. Method according to claim 1, comprising providing a urine comprising fluid as ammonium comprising fluid.

13. Method according to claim 1, comprising providing an ammonium comprising fluid having an ammonium nitrogen concentration ≅0.5 g/l.

14. Method according to claim 13, comprising providing an ammonium comprising fluid having an ammonium nitrogen concentration >1 g/l.

15. Method according to claim 14, comprising providing an ammonium comprising fluid having an ammonium nitrogen concentration >10 g/l.

16. Bio-electrochemical system for nitrogen recovery from an ammonium comprising fluid, comprising:
   an anode compartment comprising an anode;
   a cathode compartment comprising a cathode;
   wherein the compartments are separated by at least one ion exchange membrane;
   a power supply connected to the anode and the cathode; and
   an additional anode, wherein a fluid outlet of the anode compartment is connected to a fluid inlet of the compartment that comprises the additional anode.

17. Bio-electrochemical system according to claim 16, wherein the additional anode is arranged in the cathode compartment.

18. Bio-electrochemical system according to claim 16, wherein an additional compartment is arranged between the anode compartment and the cathode compartment, the additional compartment comprising the additional anode, wherein the anode compartment is separated from the additional compartment by a first ion exchange membrane and the additional compartment is separated from the cathode compartment by a second ion exchange membrane.

19. Bio-electrochemical system according to claim 16, comprising a gas outlet that is connected to a fuel cell.

* * * * *